2,960,588

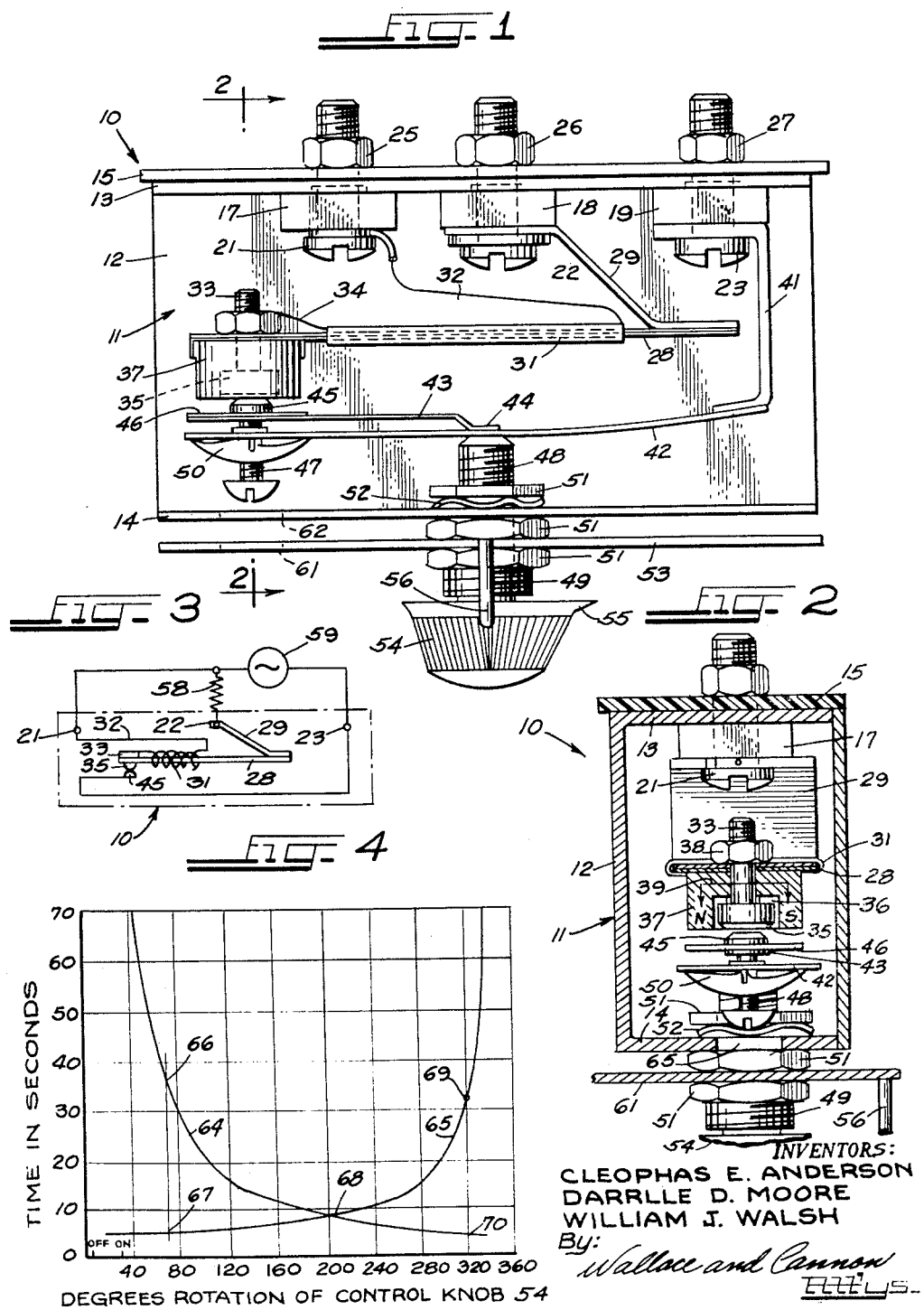

CONTROL DEVICE

Cleophas E. Anderson and Darrlle D. Moore, Dubuque, Iowa, and William J. Walsh, East Dubuque, Ill., assignors to Thermolyne Corporation, a corporation of Illinois Filed Nov. 30, 1959, Ser. No. 856,164

4 Claims. (Cl. 200—122)

This invention relates to thermally actuated control apparatus and more particularly to an electrical timing control device which is thermally actuated and which provides a relatively wide range of ratios between time-on and time-off of a controlled electrical apparatus. The control device of the invention is particularly useful in conjunction with high temperature electrical units such as electric furnaces, but may also be employed with relatively low temperature electrical heating devices such as hot plates, ovens, and the like. Moreover, the invention may also be employed as a timing control for electrical apparatus which is not directly concerned with heating.

Thermally actuated control devices have previously been employed to control electric furnaces and the like, and some of these known devices have been adapted for operation from a location remote from the controlled apparatus. Where highly accurate control of the timing of heating or other operations in the controlled device is essential, control apparatus of this kind has usually utilized a variable resistor or other electrical control element to adjust the controlled operation. In devices of this kind, certain problems have been present, to a greater or lesser extent, depending upon the precise construction of the control apparatus. Thus, contact life has been difficult to maintain, since there is a substantial tendency toward arcing between the contacts, particularly where the contacts of the control apparatus make and break with a relatively slow motion. Precision control of the timing characteristics of the control device has in some instances been rather difficult, particularly in those applications where it may be necessary to provide both gross and fine controls for the timing mechanism. This is particularly true where line voltages are subject to fluctuation and it may be necessary to compensate for such variations by automatically varying the ratio of time "on" to time "off."

It is a principal object of the invention, therefore, to provide relatively rapid "make" and "break" operations in the contacts of a thermally actuated control device, using a relatively simple and inexpensive control device structure.

More specifically, it is an object of the invention to effect a snap action in the making and breaking of the contacts of a thermally actuated control device by magnetic means, and simultaneously to use the magnetic field of the same magnetic means to reduce arcing between the contacts.

Another important object of the invention is to provide for substantially independent gross and fine control of the "off" and "on" time differential in a thermally actuated control device.

Another object of the invention is to control the timing of a thermally actuated control device primarily by variation in mechanical rather than electrical elements of the device, and at the same time to maintain independent control of gross and fine adjustments for the timing of the control device.

An additional object of the invention is to provide a novel and improved construction for a thermally actuated control device, suitable for use at a location remote from the controlled apparatus and effectively compensated for changes in ambient temperature as well as for variations in supply voltage.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

Fig. 1 is a plan view of a thermally actuated control device constructed in accordance with a preferred embodiment of the invention, one cover of the device being removed to show the working parts of the device;

Fig. 2 is a sectional view taken approximately along line 2—2 in Fig. 1;

Fig. 3 is a schematic diagram illustrating the electrical circuit for the control device; and Fig. 4 is a graph of typical operating characteristics for the device of Figs. 1–3.

The thermally actuated control device 10 illustrated in Figs. 1 and 2 comprises a frame or support member 11 which is substantially C-shaped in cross sectional configuration, as shown in Fig. 2, and comprises a pair of support elements or legs 13 and 14 connected by a base portion 12. In the preferred construction shown in Figs. 1 and 2, the support member 11 is constructed as a single unitary member from a suitable material such as sheet steel.

On the leg or support portion 13 there is mounted a terminal board 15, preferably formed from a suitable insulating material. For example, the terminal board 15 may be fabricated from a sheet of plastic, such as a phenolic resin. The terminal board 15 is held in place on the support portion 13 of the support member 11 by the three terminal lugs or screws 21, 22 and 23, which extend through the members 13 and 15 and are mounted thereon by suitable nuts or other fasteners 25, 26 and 27, respectively. The terminal lugs 21, 22 and 23 are electrically insulated from the support portion 13 by suitable insulator bushings 17, 18 and 19, respectively.

The control device 10 further includes a main bi-metal 28 which is supported from the central terminal member 22 by means of a compensating bi-metal 29, which also affords an electrical connection between the terminal 22 and the main bi-metal 28. The bi-metal 28 comprises the principal thermally operable actuating and support member for the device 10, as described more fully hereinafter. A heating coil 31 is mounted upon the bi-metal 28, preferably being disposed in an encompassing relation thereto. One end of the heater coil 31 is electrically connected to the terminal member 21, as by a conductor 32, whereas the other end of the heater is electrically connected to the bi-metal 28 and specifically to a contact member 33 mounted on the end of the bi-metal 28 opposite the connection to the bi-metal 29. Except for the terminal connection provided by the conductor 34, the heater coil 31 is electrically insulated from the bi-metal 28.

As best shown in Fig. 2, the contact member 33 extends through the bi-metal 28 and provides a first contact element 35 which faces downwardly as seen in this figure and in Fig. 1. The contact element 35 is located within a cavity 36 in a cup-shaped permanent magnet 37, the shank of the contact member extending through an aperture in the base of the cup-shaped magnet. Suitable means, such as a nut 38 threaded on to the end of the contact member 33 may be used to support both the contact member and the permanent magnet 37 on the bi-metal 28. The magnet 37 is magnetized in the general direction indicated by the arrows 39 (Fig. 2), the exact polarization of the magnet being immaterial.

As shown in Fig. 1, an electrical contactor and support element 41 is mounted upon the terminal lug 23; the member 41 is used as a support member and affords an electrical connection to a resilient contact support member or spring 42. The cantilever spring 42 extends across the control device 10 to a location aligned with the contact element 35. A second cantilever spring element 43 is affixed to the medial portion of the spring 42, in the location generally indicated by the reference character 44. At the free end of the spring 43, there is mounted a second contact element 45. In addition, a ring 46 of magnetic material is mounted on the spring 43 in encompassing relation to the contact element 45. The contact element 45 is positioned for engagement with the contact element 35 to complete an electrical circuit therebetween, as described more fully hereinafter. An adjusting screw 47 is mounted on the end of the support spring 42 in alignment with the contact element 45 and may be employed to adjust the initial or normal position of the contact element 45 relative to the contact element 35 to afford a controlled snap action in operation of the control device 10, as described in greater detail hereinafter. A lock washer 50 may be used to maintain the adjusting screw 47 in adjustable fixed position.

The principal control element for the device 10, however, comprises an adjusting screw 48. The adjusting screw 48 is threaded into a bushing 49 which is also employed in conjunction with suitable mounting means such as the nuts 51 and the lock washer 52, to mount a face plate 53 on the support portion 14 of the control device 10. A control knob 54 is affixed to the end of the adjusting screw 48 opposite the support spring 42. The knob 54 is provided with an indexing projection 55 which serves as a pointer for a scale on the face plate 53 (not shown) and which also engages a stop pin 56 to establish an initial or "off" position for the control device. As shown in Figs. 1 and 2, the pin 56 is suitably mounted upon the face plate 53 of the control device 10.

In operation, the thermally actuated control device 10 is connected in the manner shown in Fig. 3 to the apparatus, such as an electric furnace, to be controlled thereby. The controlled device, here represented by a load resistor 58, is connected to the terminal 22 and to one terminal of a suitable power supply, generally indicated by the generator 59. The power circuit is completed by connecting the other terminal of the power source 59 to the control device terminal 23. Thus, the operating circuit for the load 58 includes, in series, the power source 59, the terminal 23, the contacts 45 and 35, the bi-metal 28, the bi-metal 29, and the terminal 22. The terminal 21 of the control device 10, on the other hand, is connected to the same side of the generator 59 as the load 58. Thus, the thermal control circuit includes, in series, the terminal 21, the generator 59, the terminal 23, the contacts 45 and 35, and the heater coil 31 with its connecting conductor 32.

Normally, the contact elements 35 and 45 are held in engagement with each other by the resilient action of the support members 42 and 43. With the contacts engaged, the air gap between the magnet 37 and the magnetic disc 46 is relatively small, and the magnet tends to pull the disc 46 upwardly, as seen in Figs. 1 and 2, and therefore tends to hold the two contact elements in engagement. Under these circumstances, of course, the operating circuit for the load 58 (Fig. 3) is complete, and a complete circuit is also provided for the heater coil 31.

During a given operating interval, the coil 31 heats the bi-metal 28, tending to distort the bi-metal and to pull the end of the bi-metal which supports the contact element 35 away from the contact element 45. Initially, the bending movement of the bi-metal 28 causes a similar movement of the contact element 45, pulling the spring 43 away from the spring 42 and the adjustable stop screw 47. After a given time interval, which may be adjusted as described hereinafter, the bending of the bi-metal 28 caused by the heating of the bi-metal from the heater coil 31 pulls the contact element 45 and magnetic disc 46 to a position at which the resilient reaction force exerted by the spring 43 is sufficient to overcome the attraction between the magnet 37 and the magnetic disc 46. When this occurs, the end of the spring 43 supporting the contact element 45 moves downwardly with a snap action, effectively opening both the operating circuit for the load 58 and the operating circuit for the heater coil 31.

Thus, during the initial stage of operation, with the contacts 35 and 45 closed, the weak spring member 43 is pulled upwardly through a relatively short distance, due to the magnetic attraction of the magnet 37 for the disc 46. When the contacts are opened, due to deflection of the bi-metal 28 beyond the maximum holding point of the magnet, the spring 43 snaps back to its original position, determined by the setting of the adjusting screw 47. Consequently, when the power is cut off and the operating circuit of the heater coil 31 is de-energized, the return movement necessary to reclose the contacts 35 and 45 is larger than it would be if the contact 45 remained at the same position as when the contacts were opened. Accordingly, a substantial time interval may be necessary for cooling off the bi-metal 28 before the magnet 37 is again moved to a position close enough to the magnetic disc 46 to overcome the spring 43 and pull the contact 45 back up into engagement with the contact element 35. By adjusting the screw 47, the movement differential between the opening and closing positions of the contact elements 35 and 45 can be controlled, thereby affording a convenient and effective means for controlling the snap action of the contacts in both opening and closing movements. The face plate 53 and the housing or support portion 14 are preferably provided with suitable access apertures 61 and 62, respectively, to provide for adjustment of the screw 47.

The ratio of the time "on" to time "off" for the control device 10, the cycle time of the control device, is determined by the setting of the main adjusting screw 48, actuated by the knob 54. The main adjusting screw 48 controls the position of the main support spring 42, which is substantially stiffer than the spring 43. Adjustment of the screw 48 determines the initial position of the contact element 45 and thus determines the principal or main movement of that contact element. Fig. 4 illustrates typical operating characteristics for the control device 10, and provides a plot 64 or time "off" as a function of rotation of the control knob 54, together with a plot 65 of time "on" as a function of rotation of the control knob. Thus, for a rotation of approximately 72° from the initial or "off" position of the control knob, the time "off" is approximately 37 seconds, as indicated by the reference point 66 and the time "on" is only approximately 6 seconds as indicated by the reference point 67. With this setting, accordingly, the ratio of time "on" to time "off" is approximately 1:11. At approximately 204° rotation, the time "on" and the time "off" are equal and each is approximately 8 seconds, as indicated by the reference point 68. With a rotation of approximately 320°, on the other hand, the time "on" is approximately 36 seconds, as indicated by the reference point 69 and the time "off" is only approximately 3.6 seconds as indicated by the reference point 70. With this latter setting, therefore, the ratio of the time "on" to time "off" is approximately 10:1. Of course, the face plate 53 may be provided with a scale graduated in terms of duty cycle or timing ratio to reflect the variations illustrated in Fig. 4. Rotation of the control knob 54 to its zero or off position in engagement with the pin 56 permits the spring 42 to retract the auxiliary support spring 43 and the contact 45 to a position at which the magnetic disc 46 is separated from the magnet 37 by a distance sufficient to prevent the attraction force provided by the magnet field from bending the spring 43, thus holding the device 10 in its open-circuit or off condition.

Accordingly, it is seen that the main adjusting device comprising the adjusting screw 48 is used to adjust the position of the main support spring 42 to control overall operation of the control device 10 by changing the duty cycle of the device. The adjusting screw 47, on the other hand, is used to adjust the initial position of the contact 45 relative to the contact 35, affording an independent fine adjustment. In effect, the adjusting screw 47 controls the snap action of the device 10 in opening and closing the contact arms 35 and 45, whereas the adjusting screw 48 determines the duty cycle. Thus, both adjustments are effected mechanically and are essentially independent of any variations in voltage or other characteristics of the power supply 59. In a low-voltage situation, where the power applied to the load 58 is less than would normally be expected, the output of the heater 31 is reduced in proportion, lengthening the time required to actuate the control device and increasing the time "on" in relation to time "off." Under high-voltage conditions, the reverse is true; the heater 31 heats the bi-metal 28 faster, decreasing the "on" time relative to "off" time. Consequently, the control device 10 is effectively and completely compensated for variations in the power supply. With respect to variations in ambient temperature, on the other hand, the bi-metal 29 is effective to modify the initial position of the main bi-metal 28 to correct for any such variations.

The permanent magnet 37 and the magnetic disc or keeper 46 cooperate to afford a snap action for opening and closing of the contact elements 35 and 45 as described hereinabove. Moreover, the contact surfaces of the contact elements are substantially totally enclosed within the magnetic field of the members 37 and 46. Accordingly, this field tends to dampen arcing between the two contact elements, and thereby tends to reduce wear on the contacts which might otherwise result.

As shown in Figs. 1–3, the control device 10 is an independent timing control not directly effected by heating or other electrical operation of the controlled apparatus. On the other hand, the same device can be used as a thermostatic control unit, without modification, if the main bi-metal 28 is mounted directly on the heated device. In this case, the bi-metal or actuating member 28 respond directly to changes in temperature of the heated device, without in any way altering the snap action and arc blow-out features of the invention. With the device used in this manner, the heater 31 may be omitted, so that heating of the bi-metal 28 is effected only by heating of the controlled apparatus; on the other hand, the heater 31 may be retained as a means to speed up actuation of the control unit 10, thereby reducing the total time required for each operating cycle and affording a more constant temperature for the heated device.

Hence, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A thermally actuated control device comprising: a thermally responsive bi-metallic actuating and support member having one end movable from a given normal position through a predetermined range of operating positions in response to variations in temperature; a heater coil mounted on said actuating member; a first electrical contact element, mounted on said one end of actuating member and movable therewith and connected to said heater coil in a control circuit; a second electrical contact element; resilient support means, comprising a first relatively stiff cantilever spring, a second relatively flexible cantilever spring mounted on said first spring, and a snap action adjusting member mounted on said first spring and engaging the free end of said second spring to adjust said free end toward and away from said first contact element, said second contact element being mounted on said free end of said second spring in position to engage said first contact element when said actuating member is in said normal position, said second spring being effective to disengage said second contact element from said first contact element when said actuating member is moved through a predetermined portion of said range; a second adjusting member, engaging said first spring, for adjusting the effective operating range of movement of said contacts to determine the duty cycle of the device; and magnetic control means for effecting a snap action in engagement and disengagement of said contact, said magetic control means comprising first and second ferromagnetic members individually associated with said first and second contact elements and forming a magnetic structure substantially totally encompassing both of said contact elements, one of said ferromagnetic members comprising a permanent magnet magnetized in a direction to attract the other of said ferromagnetic members.

2. A thermally actuated control device comprising: a thermally operable actuating and support member movable from a given normal position through a predetermined range of operating positions in response to variations in temperature; an electrical heater coil disposed in encompassing relation to said actuating member to heat said actuating member; means connected to said actuating member to maintain movement thereof substantially constant for any change in temperature induced therein by said heater coil, independently of changes in ambient temperature; a first electrical contact element, mounted on said actuating member and movable therewith; a second electrical contact element; resilient support means mounting said second contact element in position to engage said first contact element when said actuating member is in said normal position and effective to disengage said second contact element from said first contact element when said actuating member is moved through a predetermined portion of said range; magnetic control means for effecting a snap action in engagement and disengagement of said contacts, said magnetic control means comprising a cup-shaped permanent magnet member mounted in encompassing relation to one of said first and second contacts and a ferromagnetic keeper member mounted adjacent the other of said contact elements, said magnet and keeper members forming a magnetic structure substantially totally encompassing the contact surfaces of said contact elements and affording a magnetic field tending to dampen arcing between said contacts; and independent gross and fine adjustment devices, engaging said resilient support means, for adjusting the effective operating range of said contacts to adjust the duty cycle of the device and for adjusting the initial starting position of said second contact, respectively.

3. A thermally actuated control device comprising: a thermally responsive bi-metallic actuating and support member having one end movable from a given normal position through a predetermined range of operating positions in response to variations in temperature; a heater mounted in heat-transferring relation to said actuating member; a first electrical contact element, mounted on said one end of actuating member and movable therewith and connected to said heater coil in a control circuit; a second electrical contact element; resilient support means, comprising a first relatively stiff cantilever spring, a second relatively flexible cantilever spring mounted on said first spring, and a snap action adjusting member mounted on said first spring and engaging the free end of said second spring to adjust said free end toward and away from said first contact element, said second contact element being mounted on said free end of said second spring in position to engage said first contact element when said actuating member is in said normal position, said second spring being effective to disengage said second contact element from said first contact element when said actuating member is moved through a predetermined portion of said range; a second adjusting member, engaging said first spring, for adjusting the effective operating range of movement of said contacts to determine the duty cycle of the device; control means for effecting a snap action in engagement and disengagement of said contact; and ambient temperature compensation means, comprising a second thermally responsive member engaging said actuating member, for maintaining movement of said actuating member substantially constant for any given change in temperature thereof induced by said heater independently of changes in ambient temperature.

4. A thermally actuated control device comprising: a thermally operable actuating and support member movable from a given normal position through a predetermined range of operating positions in response to variations in temperature; means compensating said actuating member for variations in ambient temperature; an electrical heater coil disposed in encompassing relation to said actuating member to heat said actuating member; means, connected to said actuating member to maintain movement thereof substantially constant for any change in temperature induced by said heater coil independently of changes in ambient temperature; a first electrical contact element, mounted on said actuating member and movable therewith; a second electrical contact element; resilient support means mounting said second contact element in position to engage said first contact element when said actuating member is in said normal position and effective to disengage said second contact element from said first contact element when said actuating member is moved through a predetermined portion of said range, said resilient support means comprising first and second cantilever spring members, said second spring member being mounted on said first spring member with said second contact element mounted on said second spring member; magnetic control means for effecting a snap action in engagement and disengagement of said contact; and affording a magnetic field tending to dampen arcing between said contacts; and independent gross and fine adjustment devices, engaging said first and second spring members, respectively, for adjusting the effective operating range of said contacts to adjust the duty cycle of the device and for adjusting the initial starting position of said second contact, respectively.

References Cited in the file of this patent

UNITED STATES PATENTS

| | | |
|---|---|---|
| 2,145,722 | Hall | Jan. 31, 1939 |
| 2,729,717 | Visos | Jan. 3, 1956 |
| 2,762,886 | Visos | Sept. 11, 1956 |
| 2,802,921 | Miklas | Aug. 13, 1957 |

FOREIGN PATENTS

| | | |
|---|---|---|
| 600,250 | Great Britain | Apr. 5, 1948 |